United States Patent
Cherng et al.

(10) Patent No.: US 10,121,998 B2
(45) Date of Patent: Nov. 6, 2018

(54) LITHIUM BATTERY WITH EXHAUST STRUCTURE

(71) Applicant: AMITA TECHNOLOGIES INC LTD., Taoyuan (TW)

(72) Inventors: Jing-Yih Cherng, Taoyuan (TW); Pin-Shiuan Li, Taoyuan (TW); Tsung-Tien Cheng, Taoyuan (TW)

(73) Assignee: AMITA TECHNOLOGIES INC LTD., Taoyuan (TW)

( * ) Notice: Subject to any disclaimer, the term of this patent is extended or adjusted under 35 U.S.C. 154(b) by 62 days.

(21) Appl. No.: 15/588,673

(22) Filed: May 7, 2017

(65) Prior Publication Data

US 2017/0331088 A1 Nov. 16, 2017

(30) Foreign Application Priority Data

May 13, 2016 (TW) .............................. 105206970 U

(51) Int. Cl.
*H02J 7/00* (2006.01)
*H01M 2/12* (2006.01)
*H01M 10/0525* (2010.01)
*H01M 10/052* (2010.01)
*H01M 2/10* (2006.01)

(52) U.S. Cl.
CPC ....... *H01M 2/1205* (2013.01); *H01M 2/1223* (2013.01); *H01M 10/052* (2013.01); *H01M 10/0525* (2013.01); *H02J 7/0068* (2013.01); *H01M 2/1061* (2013.01); *H01M 2200/20* (2013.01); *H01M 2220/30* (2013.01)

(58) Field of Classification Search
CPC ............. H01M 2/1205; H01M 2/1223; H01M 2/1061; H01M 10/052; H01M 10/0525; H01M 2220/20; H01M 2220/30; H02J 7/0068
USPC ....................................................... 320/128
See application file for complete search history.

(56) References Cited

U.S. PATENT DOCUMENTS

| | | | |
|---|---|---|---|
| 4,376,739 A * | 3/1983 | Passey, Jr. ............... | F02M 3/10 123/25 B |
| 9,979,005 B2 * | 5/2018 | Guen .................... | H01M 2/345 |
| 2008/0155985 A1* | 7/2008 | Labrador ............... | F01K 27/00 60/698 |
| 2010/0099014 A1* | 4/2010 | Zheng .................... | F16K 17/02 429/56 |
| 2013/0183558 A1* | 7/2013 | Nakayama .......... | H01M 2/1252 429/88 |
| 2017/0047630 A1* | 2/2017 | Cherng ................. | H01M 16/00 |

* cited by examiner

*Primary Examiner* — M'Baye Diao
(74) *Attorney, Agent, or Firm* — Chun-Ming Shih; HDLS IPR Services

(57) ABSTRACT

A lithium battery cell capable of exhausting a gas includes a battery cell with an opening for discharging the gas, and an exhaust structure combined to the battery cell and having a tube sleeve, a stop portion and a plug. The tube sleeve is installed to the opening of the battery cell; the stop portion is disposed at an end of the tube sleeve and has an exhaust end communicated with the tube sleeve and the outside; the plug is installed into the tube sleeve to block a side opening of the tube sleeve, blocked by the stop portion to prevent it from separating from the tube sleeve, and pushed by the gas to release its connection with the tube sleeve; and a gap is formed between the plug and the tube sleeve to allow the gas to flow through and exit from the exhaust vent to the outside.

12 Claims, 6 Drawing Sheets

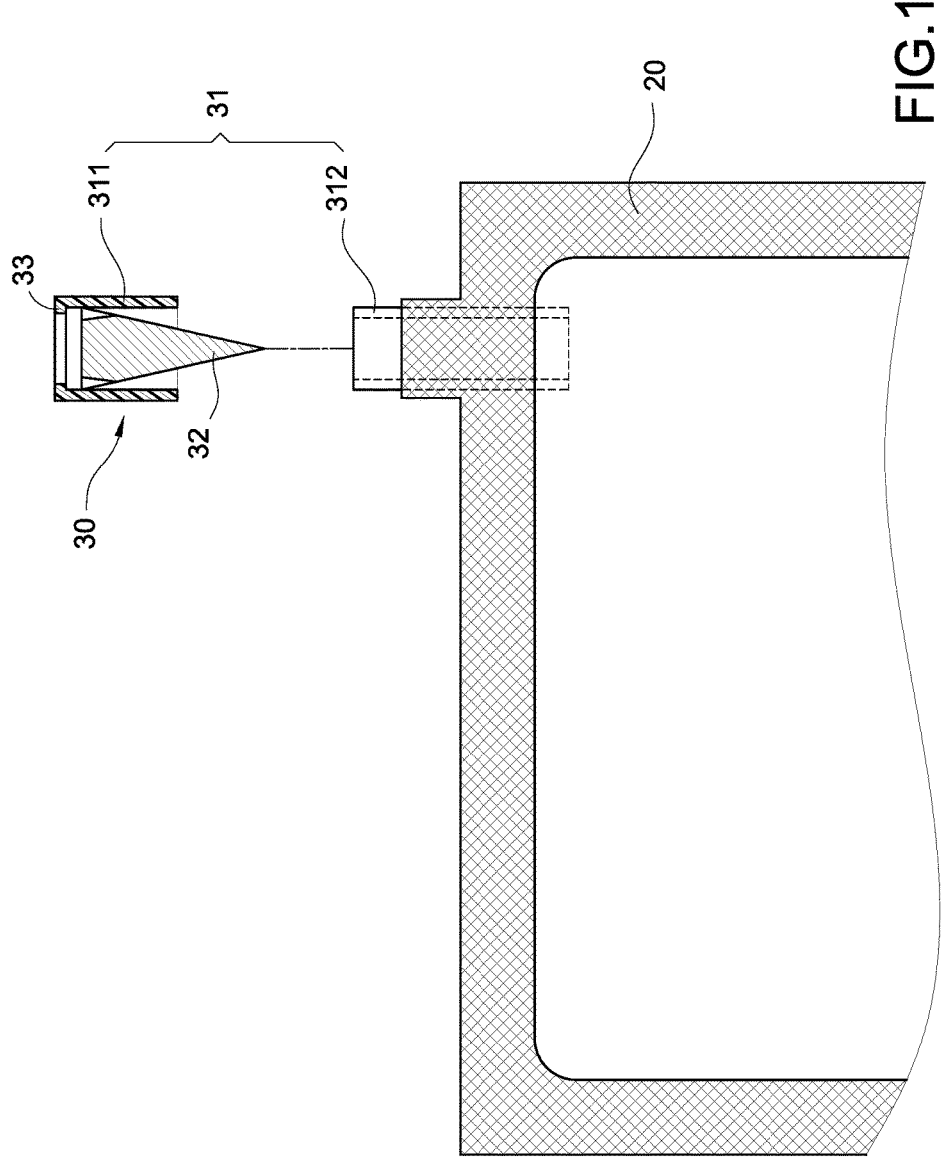

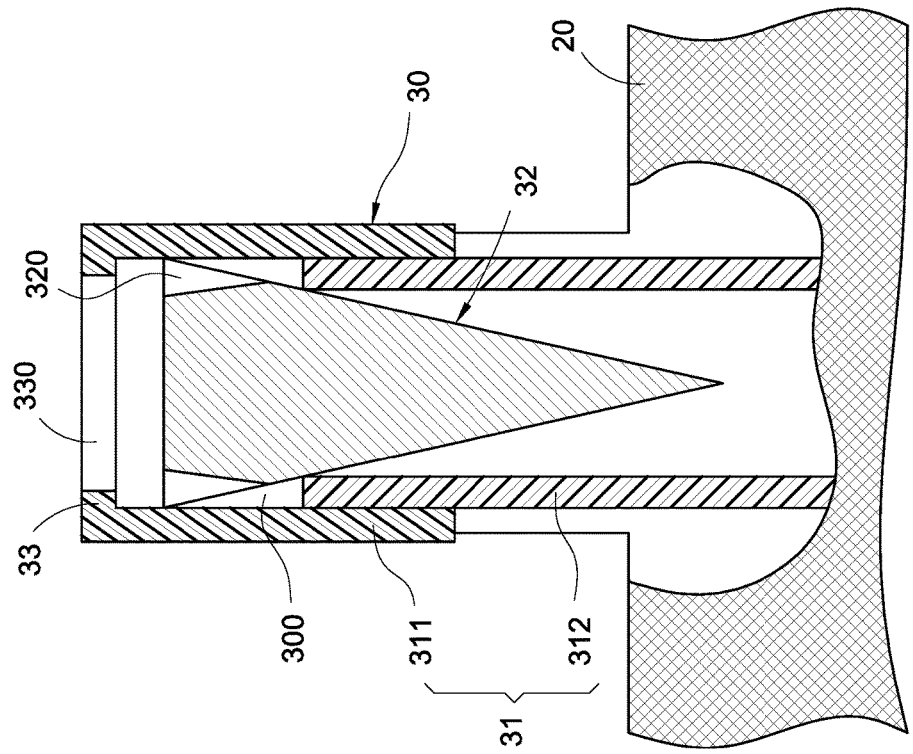
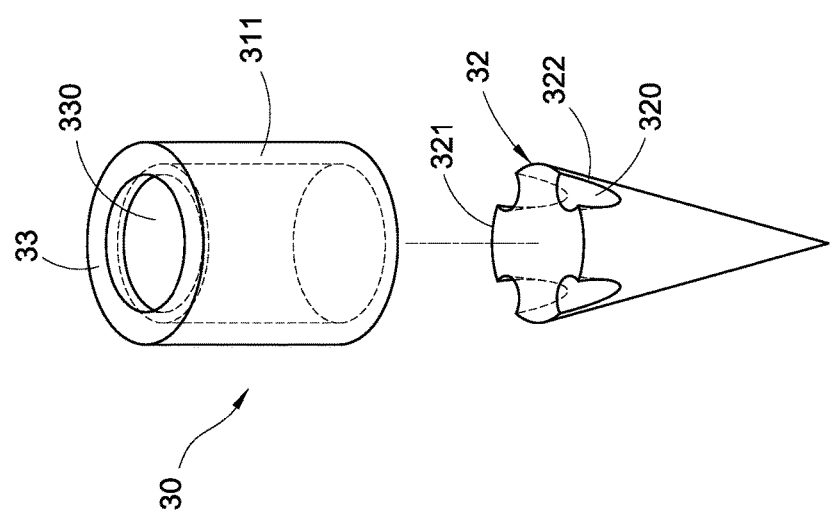

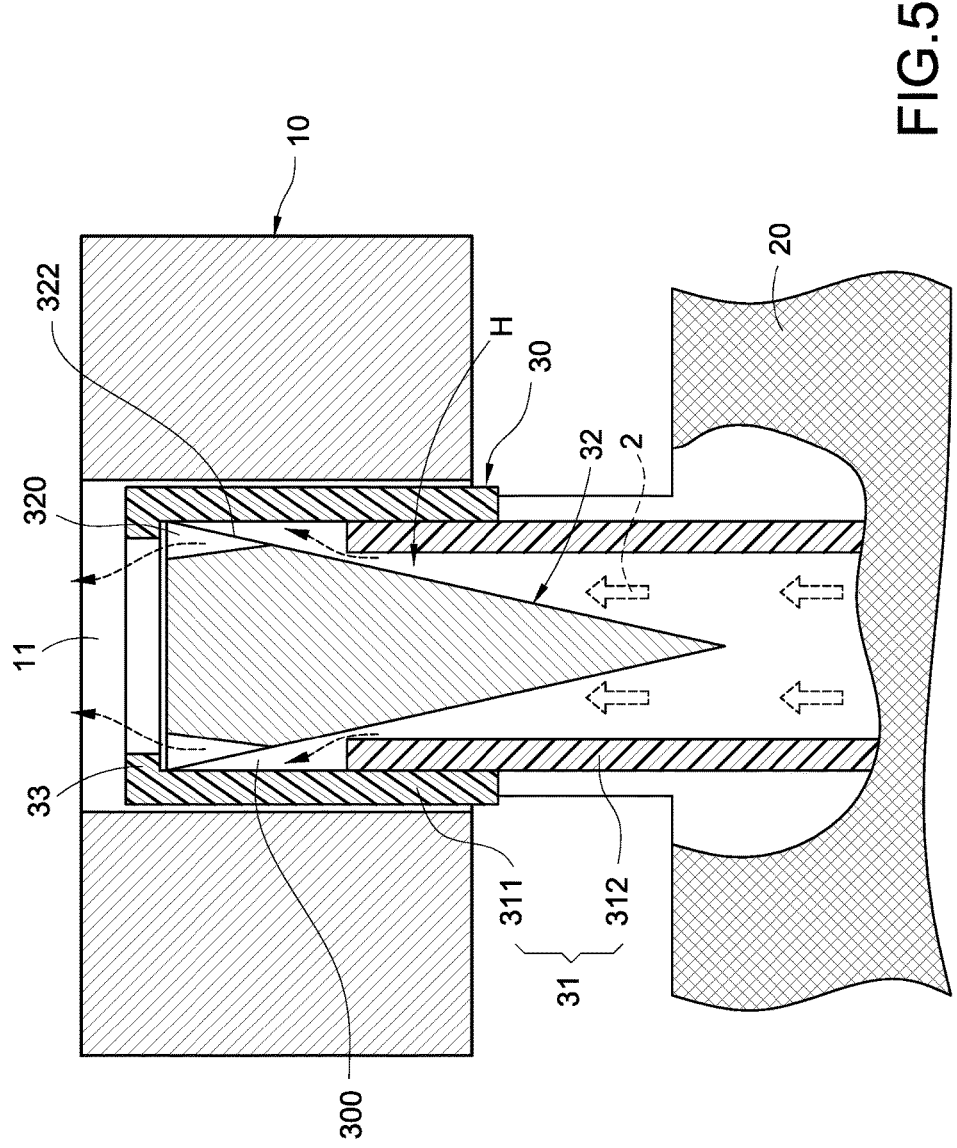

LITHIUM BATTERY WITH EXHAUST STRUCTURE

FIELD OF THE INVENTION

The technical field relates to a lithium battery, more particularly to a lithium battery with an exhaust structure.

BACKGROUND OF THE INVENTION

Lithium ion battery is a preferred battery for portable electronic products. In general, a lithium battery generates electric power by a chemical reaction between electrodes of a battery cell and an electrolyte. However, if the battery cell is abnormally used (or overcharged), materials such as the electrolyte may be decomposed in the chemical reaction to produce a flammable gas (such as hydrogen, etc), and such gas may cause an increase of the internal pressure of a casing of the battery, and thus resulting in a deformation of the casing or even an explosion.

Therefore, it is a main subject of this disclosure to improve the safety of the battery cell and discharge the flammable gas from the battery to prevent the flammable gas from filling the battery cell and prevent explosions by installing an exhaust structure on the battery cell.

In view of the aforementioned problems of the prior art, the discloser of this disclosure based on years of experience in the related industry to conduct extensive researches and experiments, and finally provided a feasible solution to overcome the problems of the prior art.

SUMMARY OF THE INVENTION

It is a primary objective of this disclosure to provide a lithium battery with an exhaust structure, so that a gas can be exhausted by an exhaust structure and will not accumulated in a battery cell, so as to maintain the internal pressure of the battery cell and prevent explosions.

To achieve the aforementioned and other objectives, this disclosure provides a lithium battery with an exhaust structure, comprising a battery cell and an exhaust structure. The battery cell has an opening for discharging a gas. The exhaust structure is combined with the battery cell and comprises a tube sleeve, a stop portion and a plug. The tube sleeve is passed and installed to the opening of the battery cell, and the stop portion is disposed at an end of the tube sleeve and has an exhaust vent communicated with the tube sleeve and an external environment. The plug is pressed and installed into the tube sleeve for blocking a side opening of the tube sleeve and blocked by the stop portion to prevent the plug from separating from the tube sleeve, and the plug is pushed by a gas to release from the connection with the tube sleeve, and a gap is formed between the plug and an inner wall surface of the tube sleeve, and the gas flows out from the gap and flows from the exhaust vent to the external environment, so that the gas can be discharged through the exhaust structure and will not be accumulated in the battery cell, so as to maintain the internal pressure of the battery cell and prevent explosions.

Compared with the prior art, the lithium battery of this disclosure has the exhaust structure combined with the exhaust tube of the battery cell, so that when the gas produced by the battery cell and flowing along the exhaust tube is accumulated to press the bottom of the plug of the tube sleeve. After the gas is accumulated to a certain quantity, the gas will push the plug away from the tube sleeve and then flows through the gap between the plug and the tube sleeve to the outside. Therefore, the gas can be timely discharged to the outside through the exhaust tube and the exhaust structure and will not be accumulated in the battery cell, so as to maintain the internal pressure of the battery cell and prevent explosions.

BRIEF DESCRIPTION OF THE DRAWINGS

FIG. 1 is a cross-sectional view of a lithium battery with an exhaust structure of this disclosure;

FIG. 2 is an exploded view of an exhaust structure of this disclosure;

FIG. 3 is an exploded view of a lithium battery with an exhaust structure of this disclosure;

FIG. 5 is a schematic view of using a lithium battery with an exhaust structure of this disclosure;

DESCRIPTION OF THE PREFERRED EMBODIMENTS

Figure 4:
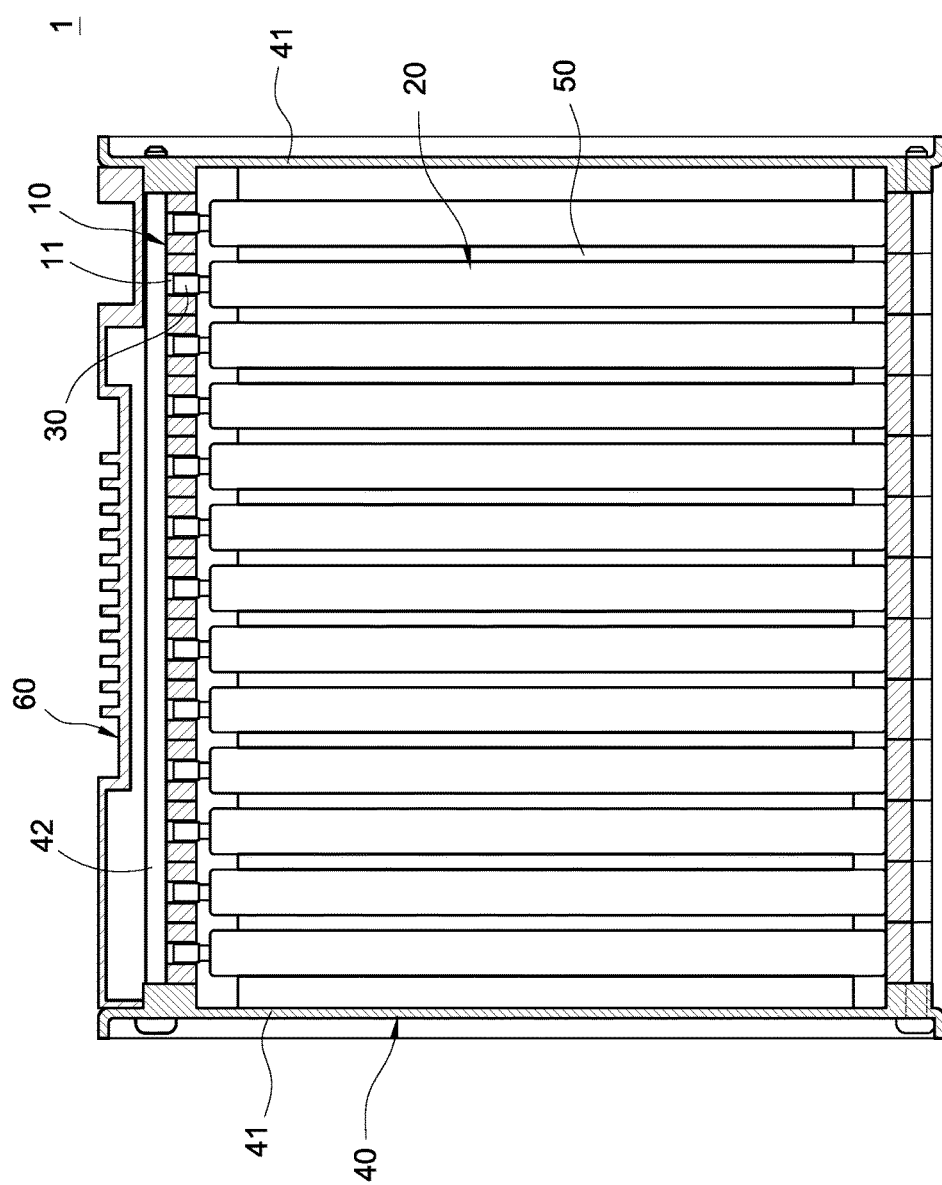
FIG. 4 is a cross-sectional view of a lithium battery of this disclosure.

The technical contents of this disclosure will become apparent with the detailed description of preferred embodiments accompanied with the illustration of related drawings as follows. It is intended that the embodiments and figures disclosed herein are to be considered illustrative rather than restrictive.

With reference to FIG. 1 for a schematic view of a lithium battery with an exhaust structure of this disclosure, the lithium battery comprises a battery cell 20 and an exhaust structure 30, and the exhaust structure 30 is combined with the battery cell 20.

In this embodiment, the battery cell 20 has an opening communicated with the interior of the battery cell 20 and capable of discharging a gas. Preferably, the battery cell 20 is a lithium battery cell with an aluminum foil bag package. In addition, the exhaust structure 30 includes a tube sleeve 31, a stop portion 33 and a plug 32. The tube sleeve 31 is passed and installed into an opening of the battery cell 20, and the stop portion 33 is disposed at an outer end of the tube sleeve 31, and the plug 32 is pressed and installed into the tube sleeve 31. The exhaust structure 30 will be described in details below.

With reference to FIGS. 2 and 3 for an exploded view and a cross-sectional view of an exhaust structure of this disclosure respectively, the tube sleeve 31 of this embodiment comprises a valve tube 311 and an exhaust tube 312, and the exhaust tube 312 is passed and inserted into the opening of the battery cell 20, and the valve tube 311 is sheathed on the exhaust tube 312. The stop portion 33 has an exhaust vent 330 communicated with the tube sleeve 31 and an external environment. The plug 32 is installed in the valve tube 311. In practice, the plug 32 is acted by the internal pressure of the battery cell 20 to block a side opening of the tube sleeve 31, and the plug 32 is blocked by the stop portion 33 to prevent the plug 32 from separating from the tube sleeve 31.

In this embodiment, the plug 32 is in a conical shape, and the plug 32 has a bottom surface 321 and a half conical surface 322 formed on the bottom surface 321, and the half conical surface 322 has a plurality of grooves 320 formed thereon and extended to the bottom surface 321. In addition, the stop portion 33 is extended from an outer periphery of the tube sleeve 31 (or the valve tube 311) towards an inner side of the tube sleeve 31 to form a ring plate. In addition, the plug 32 has a side pressing and plugging a port of the exhaust tube 312 and the other side maintaining a moving space 300 from the stop portion 33.

With reference to FIG. 4 for a cross-sectional view of a lithium battery of this disclosure, a battery cell is installed in a frame 10, and the frame 10 is clamped in a holder 40 to constitute a lithium battery 1. Preferably, the frame 10 has a through hole 11, and the exhaust tube 312 is passed into the through hole 11, and the exhaust structure 30 is disposed in the through hole 11.

Further, the holder 40 comprises a pair of clamping boards 41 and a plurality of rods 42. In addition, the frame 10 and the battery cell 20 come with a plural quantity, and the frames 10 and the battery cells 20 are stacked and arranged between the pair of clamping boards 41, and the pair of clamping boards 41 are provided for supporting the battery cells 20, and the rods 42 are passed and connected to the battery cells 20 and the pair of clamping boards 41 to form a lithium battery 1.

Preferably, the lithium battery 1 further comprises a plurality of spacers 50 and a circuit board module 60. The spacers 50 are inserted and installed between adjacent battery cells 20 to separate and position the battery cells 20. The circuit board module 60 is electrically coupled to the battery cell 20 for controlling the charge and discharge operations of the lithium battery 1.

With reference to FIG. 5 for a schematic view of using a lithium battery with an exhaust structure of this disclosure, when the battery cell 20 produces a gas 2, the gas 2 will flow from the battery cell 20 to the outside along the exhaust tube 312 and will be accumulated at the bottom of the plug 32. After the gas 2 is accumulated to a certain quantity, the plug 32 is pushed by the gas 2 to release from the connection with the tube sleeve 31 and a gap H is formed between the plug 32 and an inner wall surface of the tube sleeve 31. Now, the gas 2 flows out from the gap H between the plug 32 and the tube sleeve 31. In this embodiment, the gas 2 flows out from the groove 320 of the plug 32. Finally, the gas 2 flows from the exhaust vent 330 of the stop portion 33 to the external environment.

Therefore, the gas 2 produced by the battery cell 20 can be timely discharged to the outside through the exhaust tube 312 and the exhaust structure 30, so that the gas 2 will not be accumulated in the battery cell 20, so as to maintain the internal pressure of the battery cell 20 and prevent explosion.

Figure 7:
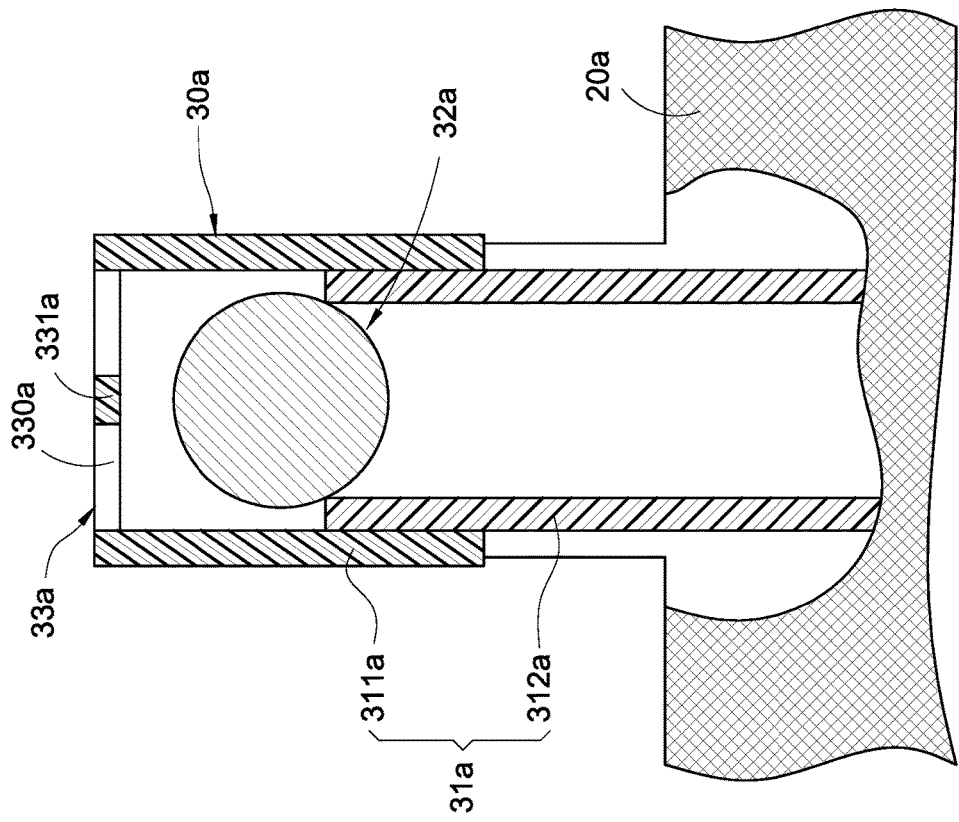
FIG. 7 is a cross-sectional view of an exhaust structure of another embodiment of this disclosure.
Figure 6:
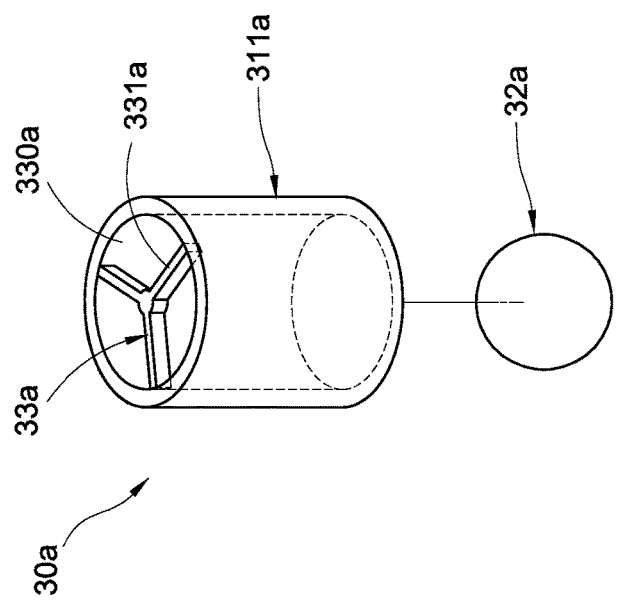
FIG. 6 is an exploded view of an exhaust structure of another embodiment of this disclosure.

With reference to FIGS. 6 and 7 for an exploded view and a cross-sectional view of an exhaust structure in accordance with another embodiment of this disclosure respectively, the exhaust structure 30a is combined with the battery cell 20a. The exhaust structure 30a comprises a tube sleeve 31a, a plug 32a and a stop portion 33a. The tube sleeve 31a comprises a valve tube 311a and an exhaust tube 312a, and the stop portion 33a has an exhaust vent 330a. The difference between this embodiment and the previous embodiment resides on the configuration of the plug 32a and the stop portion 33a.

In this embodiment, the plug 32a is a sphere, and the stop portion 33a is integrally formed with the tube sleeve 31a (or the valve tube 311a). The stop portion 33a comprises a plurality of support ribs 331a arranged into a Y-shape and formed at an external port of the tube sleeve 31a.

Similarly, the plug 32a is pushed by the gas to release from the connection with the exhaust tube 312a, and the gas flows between the plug 32a and the exhaust tube 312a. Finally, the gas is discharged from the exhaust vent 330a of the stop portion 33a and dispersed to the external environment.

Figure 8:
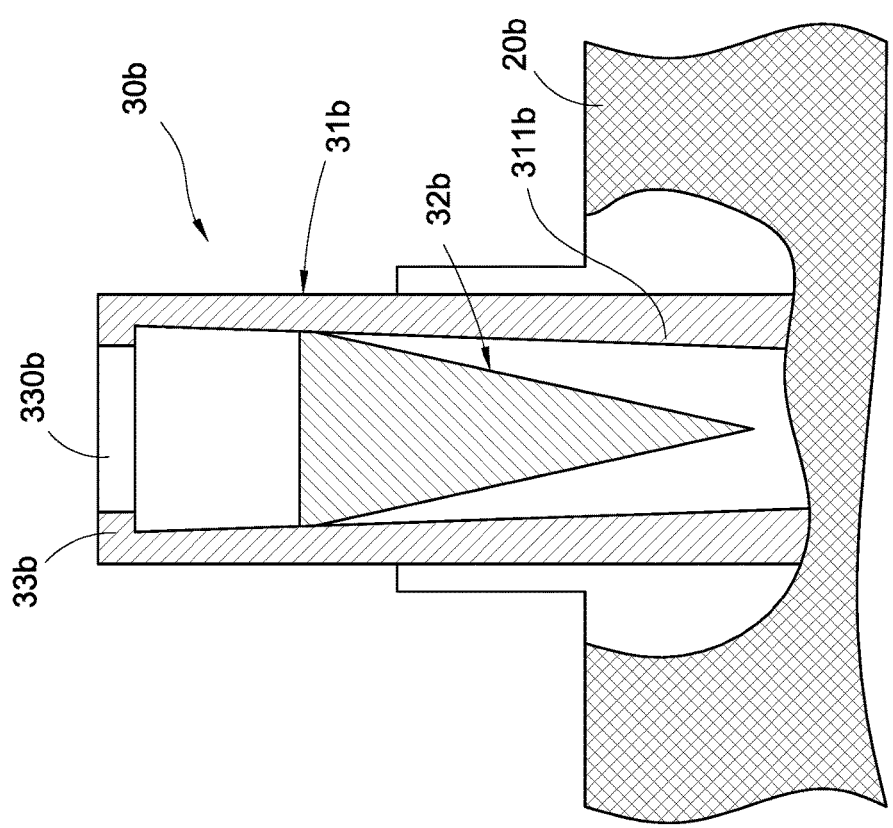
FIG. 8 is a cross-sectional view of an exhaust structure of a further embodiment of this disclosure.

With reference to FIG. 8 for a cross-sectional view of an exhaust structure in accordance with a further embodiment of this disclosure, the exhaust structure 30b is combined with the battery cell 20b. The exhaust structure 30b comprises a tube sleeve 31b, a plug 32b and a stop portion 33b, and the stop portion 33b has an exhaust vent 330b. The difference between this embodiment and the previous embodiment resides on the configuration of the tube sleeve 31b.

In this embodiment, the tube sleeve 31b omits the exhaust tube and the inner wall surface of the tube sleeve 31 is formed into an oblique conical surface 311b, and the plug 32b is a cone. In addition, the plug 32b is pressed and installed into the tube sleeve 31b to block a side opening of the tube sleeve 31b. Preferably, the plug 32b is pressed and installed to the oblique conical surface 311b. Other operations and structures are the same as those of the previous embodiment and thus will not be repeated.

While this disclosure has been described by means of specific embodiments, numerous modifications and variations could be made thereto by those skilled in the art without departing from the scope and spirit of this disclosure set forth in the claims.

What is claimed is:

1. A lithium battery with an exhaust structure, comprising:
  a battery cell, having an opening for discharging a gas; and
  an exhaust structure, combined with the battery cell, and comprising:
    a tube sleeve, passed and installed onto the opening of the battery cell;
    a stop portion, disposed at an end of the tube sleeve, and having an exhaust vent communicating with the tube sleeve and an external environment; and
    a plug, pressed and installed into the tube sleeve, for plugging and blocking a side opening of the tube sleeve, and blocked by the stop portion to prevent the plug from separating from the tube sleeve, and being pushed by the gas and released from the connection with the tube sleeve, and a gap being formed between the plug and an inner wall face of the tube sleeve, and the gas flowing out from the gap and flowing from the exhaust vent to the external environment.

2. The lithium battery with an exhaust structure according to claim 1, wherein the tube sleeve comprises a valve tube and an exhaust tube, and the exhaust tube is passed and inserted into the opening, and the valve tube is sheathed on the exhaust tube.

3. The lithium battery with an exhaust structure according to claim 1, wherein the plug is in a conical shape, and the plug has a bottom surface and a half conical surface formed on the bottom surface, and the half conical surface has a plurality of grooves extended to the bottom surface.

4. The lithium battery with an exhaust structure according to claim 1, wherein the stop portion is extended from an outer periphery of the tube sleeve towards the inner side of the tube sleeve to form a ring plate.

5. The lithium battery with an exhaust structure according to claim 2, wherein the plug has a side abutting a port of the exhaust tube and the other side maintaining a moving space from the stop portion.

6. The lithium battery with an exhaust structure according to claim 1, wherein the plug is a sphere.

7. The lithium battery with an exhaust structure according to claim 1, wherein the stop portion is integrally formed with the tube sleeve, and the stop portion includes a plurality of support ribs arranged into a Y-shape.

8. The lithium battery with an exhaust structure according to claim 2, further comprising a frame installed with the battery cell, and the frame having a through hole for passing the exhaust tube, and the exhaust structure being disposed in the through hole.

9. The lithium battery with an exhaust structure according to claim 8, further comprising a holder including a pair of clamping boards and a plurality of rods, and the frame and the battery cell coming with a plural quantity, and the frames and the battery cells being stacked and arranged between the pair of clamping boards, and the rods being passed and coupled to the battery cells and the pair of clamping boards.

10. The lithium battery with an exhaust structure according to claim 9, further comprising a plurality of spacers inserted between adjacent battery cells respectively.

11. The lithium battery with an exhaust structure according to claim 1, further comprising a circuit board module electrically coupled to the battery cell for controlling the charge and discharge operations of the lithium battery.

12. The lithium battery with an exhaust structure according to claim 1, wherein the tube sleeve has an inner wall surface formed to be an oblique conical surface.

\* \* \* \* \*